US012597408B2

(12) United States Patent
Lee et al.

(10) Patent No.: US 12,597,408 B2
(45) Date of Patent: Apr. 7, 2026

(54) SOUND ABSORBING DEVICES FOR PANELS WITH OPENINGS

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 446 days.

(21) Appl. No.: 17/951,414

(22) Filed: Sep. 23, 2022

(65) Prior Publication Data

US 2024/0105155 A1 Mar. 28, 2024

(51) Int. Cl.
*G10K 11/172* (2006.01)
*G10K 11/16* (2006.01)

(52) U.S. Cl.
CPC .......... *G10K 11/172* (2013.01); *G10K 11/161* (2013.01)

(58) Field of Classification Search
CPC .. F24F 13/24; F24F 2013/245; G10K 11/172; G10K 11/161; F01N 1/026
USPC .......................................................... 181/224
See application file for complete search history.

(56) References Cited

U.S. PATENT DOCUMENTS

| | | | | |
|---|---|---|---|---|
| 2,308,886 A * | 1/1943 | Mason | F16L 55/033 181/224 |
| 3,955,643 A * | 5/1976 | Clark | F01N 1/006 181/248 |
| 4,091,892 A * | 5/1978 | Hehmann | G10K 11/172 181/252 |
| 4,109,754 A * | 8/1978 | Purhonen | F24F 13/24 181/252 |

(Continued)

FOREIGN PATENT DOCUMENTS

| | | |
|---|---|---|
| JP | 2008255969 A | 10/2008 |
| JP | 2019152726 A | 9/2019 |

(Continued)

*Primary Examiner* — Jeremy A Luks
(74) *Attorney, Agent, or Firm* — Christopher G. Darrow; Darrow Mustafa PC

(57) ABSTRACT

A sound absorbing device includes a panel with an opening, a duct extending from the panel and in fluid communication with the opening, and a plurality of acoustic resonators embedded in the panel and in fluid communication with the duct. The duct can have a rectangular cuboid shape and the plurality of acoustic resonators can include a first subset of quarter-wavelength tubes extending from a first planar side of the duct, a second subset of quarter-wavelength tubes extending from a second planar side of the duct, a third subset of quarter-wavelength tubes extending from a third planar side of the duct, and a fourth subset of quarter-wavelength tubes extending from a fourth planar side of the duct. Also, the second subset of quarter-wavelength tubes and the fourth subset of quarter-wavelength tubes can have mirror symmetry with the first subset of quarter-wavelength tubes and the third subset of quarter-wavelength tubes, respectively.

12 Claims, 4 Drawing Sheets

(56) References Cited

U.S. PATENT DOCUMENTS

| | | | | |
|---|---|---|---|---|
| 4,128,769 | A * | 12/1978 | Bons | F02C 7/24 181/282 |
| 4,645,032 | A * | 2/1987 | Ross | F02K 1/827 181/224 |
| 5,869,792 | A * | 2/1999 | Allen | F16L 55/0333 181/224 |
| 6,533,657 | B2 | 3/2003 | Monson et al. | |
| 6,892,851 | B2 | 5/2005 | Lee | |
| 6,896,095 | B2 * | 5/2005 | Shah | F01P 5/06 181/198 |
| 8,127,886 | B2 | 3/2012 | Utsunomiya | |
| 8,770,340 | B2 | 7/2014 | Cursetjee | |
| 9,305,539 | B2 | 4/2016 | Lind et al. | |
| 9,327,812 | B2 * | 5/2016 | Kim | F04D 3/00 |
| 10,107,139 | B1 * | 10/2018 | Jones | E04B 1/74 |
| 11,674,716 | B2 * | 6/2023 | Balaguru | G10K 11/172 181/224 |
| 11,727,911 | B2 * | 8/2023 | Linke | G10K 11/162 181/249 |
| 11,965,442 | B2 * | 4/2024 | Lee | G10K 11/161 |
| 2007/0292261 | A1 * | 12/2007 | Tang | F04D 29/663 415/119 |
| 2017/0074288 | A1 | 3/2017 | Venugopal Setty et al. | |
| 2020/0066245 | A1 * | 2/2020 | Lee | G10K 11/172 |
| 2021/0095888 | A1 * | 4/2021 | Eichelberger | F01N 1/089 |
| 2021/0295814 | A1 * | 9/2021 | Lee | G10K 11/162 |
| 2021/0301965 | A1 | 9/2021 | Lee et al. | |
| 2021/0318023 | A1 * | 10/2021 | Balaguru | G10K 11/172 |
| 2022/0357075 | A1 * | 11/2022 | Hakuta | F24F 13/24 |
| 2024/0292152 | A1 * | 8/2024 | Lee | G10K 11/161 |

FOREIGN PATENT DOCUMENTS

| | | | |
|---|---|---|---|
| KR | 20100134274 | A | 10/2010 |
| WO | 2022013280 | A1 | 1/2022 |

* cited by examiner

SOUND ABSORBING DEVICES FOR PANELS WITH OPENINGS

TECHNICAL FIELD

The present disclosure relates generally to sound absorbing devices, and particularly to sound absorbing devices that include acoustic resonators.

BACKGROUND

Acoustic noise resulting from a gas (e.g., air) flowing through an opening in a panel can be undesirable. For example, a duct can be used to provide air flow to the opening and the velocity of the air in combination with the cross section area of the duct can result in an audible noise that may be unpleasant to an individual standing or seated in proximity to the opening.

An acoustic resonator, e.g., a Helmholtz resonator or a quarter-wavelength tube, can be used for acoustic absorption of a specific frequency range. However, if air flows through the duct at different velocities, then acoustic noise resulting from frequencies outside the specific frequency range is not absorbed. Stated differently, an acoustic resonator does not provide broadband acoustic absorption. In addition, attachment and support of multiple acoustic resonators around a duct can be problematic.

The present disclosure addresses issues related to the use of acoustic resonators for broadband acoustic absorption, and other issues related to acoustic absorption.

SUMMARY

This section provides a general summary of the disclosure and is not a comprehensive disclosure of its full scope or all of its features.

In one form of the present disclosure, a sound absorbing device includes a panel with an opening, a duct extending from the panel and in fluid communication with the opening, and a plurality of acoustic resonators embedded within the panel and in fluid communication with the duct.

In another form of the present disclosure, a sound absorbing device includes a panel with an opening, a duct extending from the panel and in fluid communication with the opening, and a plurality of quarter-wavelength acoustic resonators embedded within the panel and in fluid communication with the duct.

In still another form of the present disclosure, a sound absorbing device includes a panel with an opening, a duct extending from the panel and in fluid communication with the opening, and a plurality of acoustic resonators embedded within the panel and in fluid communication with the duct. The duct has a rectangular cuboid shape and the plurality of acoustic resonators include a first subset of quarter-wavelength acoustic resonators extending from a first planar side of the duct, a second subset of quarter-wavelength acoustic resonators extending from a second planar side of the duct, a third subset of quarter-wavelength acoustic resonators extending from a third planar side of the duct, and a fourth subset of quarter-wavelength acoustic resonators extending from a fourth planar side of the duct.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides sound absorbing devices that absorb or suppress acoustic noise resulting from a gas (e.g., air) flowing through an opening in a panel. The sound absorbing device includes the panel with the opening, a duct extending from the panel and in fluid communication with the opening, and a plurality of acoustic resonators (also referred to herein simply as "acoustic resonators") embedded in the panel and in fluid communication with the duct The acoustic resonators can be quarter-wavelength acoustic resonators with a resonance frequency 'f' equal to $f=c/4L$, where c equals the speed of sound and L is the length of a particular acoustic resonator. Accordingly, in some variations the acoustic resonators have different lengths such that acoustic waves with a broad range of frequencies are absorbed and/or suppressed before exiting the opening.

Figure 1A:
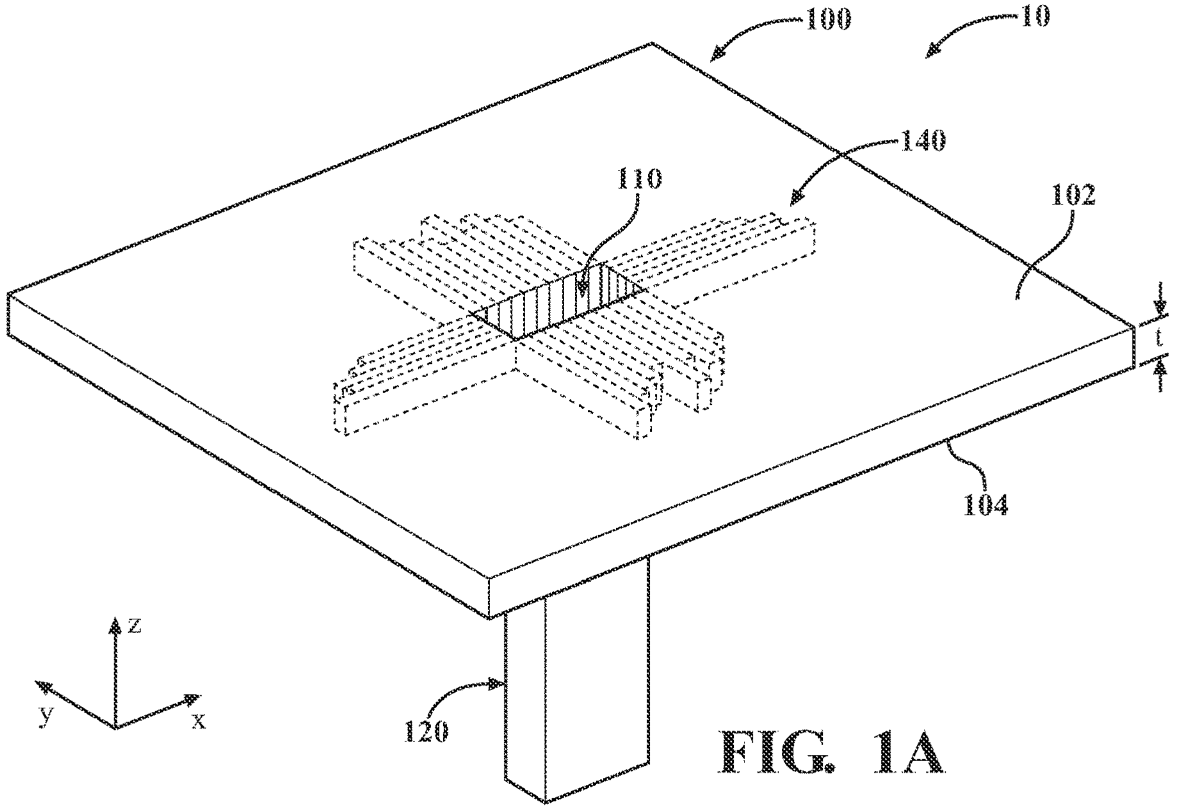
FIG. 1A shows a perspective view of a sound absorbing device according to the teachings of the present disclosure.
Figure 1B:
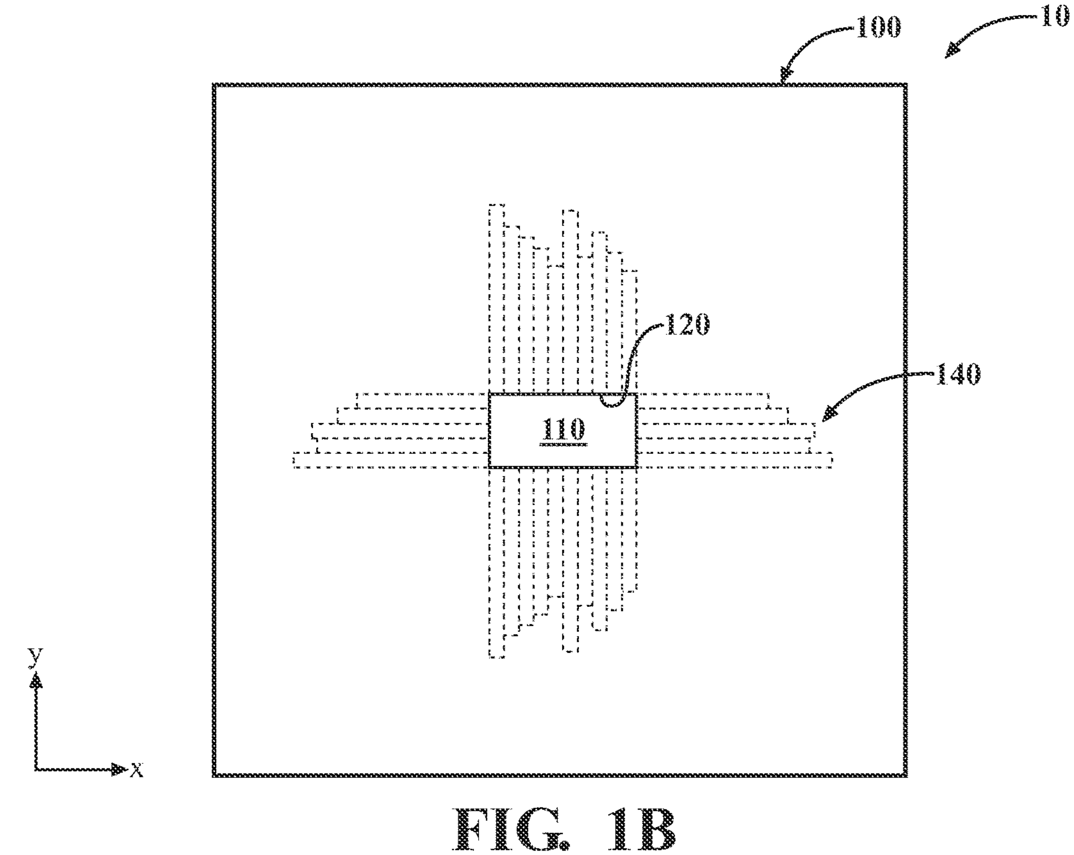
FIG. 1B shows a top view of the sound absorbing device in FIG. 1A.

Referring to FIGS. 1A and 1B, a perspective view of a sound absorbing device 10 according to the teachings of the present disclosure is shown in FIG. 1A and a top view (i.e., viewed from the −z direction) of the sound absorbing device 10 is shown in FIG. 1B. The sound absorbing device 10 includes a panel 100 with an opening 110 extending through the panel 100, a duct 120 extending from the panel 100 and in fluid communication with the opening 110, and acoustic resonators 140 embedded within the panel 100 and in fluid communication with the duct 120. The panel 100 has a first surface 102 (e.g., an outer surface) and a second surface 104 (e.g., an inner surface) spaced part from the first surface 102 by a thickness 't'.

The opening 110 has a length dimension (x direction shown in the figures), a width direction (y direction) and a thickness t. Accordingly, the opening 110 extends between the first surface 102 and the second surface 104. And while the opening 110 and/or the duct 120 shown in FIGS. 1A-1B has/have a rectangular (x-y plane) or rectangular cuboid shape with four planar sides, it should be understood that the opening 110 can have other shapes such as a circular shape (in the x-y plane), an elliptical shape, or a polyhedron shape such as a triangular shape (in the x-y plane), a pentagon shape, a hexagon shape, among others. In addition, it should be understood that the duct 120 has a panel end (not labeled), i.e., an end that is contact with the panel 100, that is complimentary in shape with the opening 110 such that gas flows through the duct 120 towards the opening 110, and then exits the opening on the +z side of the panel 100.

In some variations, the acoustic resonators 140 are completely embedded within the panel 100. For example, in at least one variation one or more of the acoustic resonators 140 is/are disposed within the panel 100 between the first surface 102 and the second surface 104, and is/are spaced apart from the first surface 102 and/or the second surface 104 by a predefined distance. In other variations, one or more of the acoustic resonators 140 has a surface that forms at least part of the first surface 102 and/or the second surface 104, i.e., there is no predefined distance between one or more of the acoustic resonators 140 and the first surface and/or the second surface 104. In at least one variation, one or more of the acoustic resonators 140 has a portion that is disposed within the panel 100 and another portion that extends from the panel 100, i.e., only a portion of the one or more acoustic resonators is disposed within the panel 100. And in some variations, one or more of the acoustic resonators 140 are in fluid communication with the duct 120 and not embedded within the panel 100, i.e., one or more of the acoustic resonators 140 are in fluid communication with the duct 120 and are not embedded completely or partially within the panel 100.

Figure 2A:
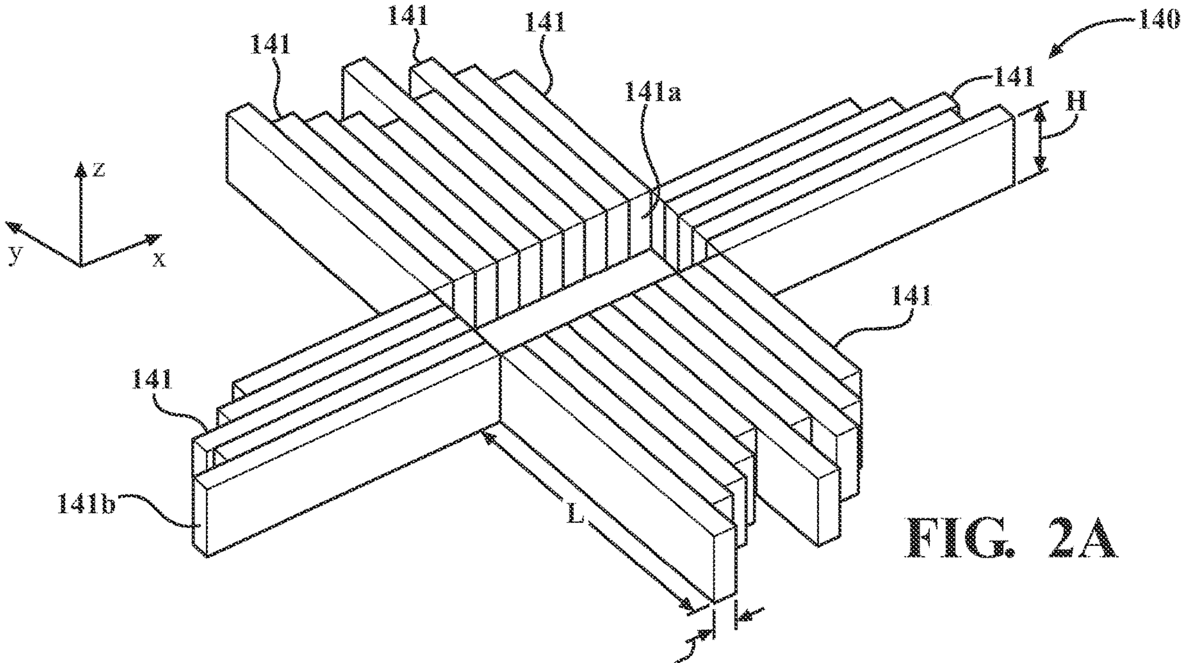
FIG. 2A shows a perspective isolated view of the plurality of acoustic resonators in FIG. 1A.
Figure 2B:
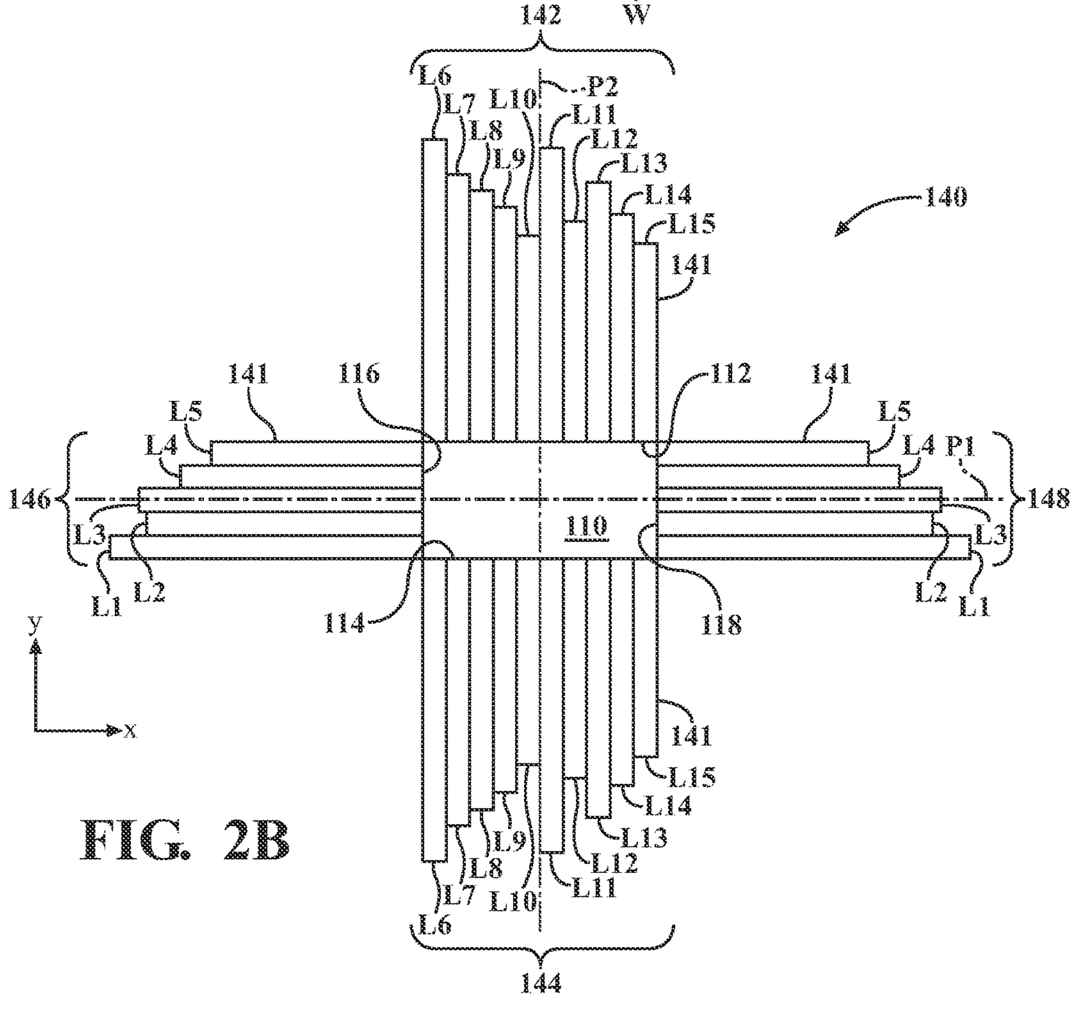
FIG. 2B shows a top view of the plurality of acoustic resonators in FIG. 2A.

Referring now to FIGS. 2A and 2B, a perspective isolated view of the acoustic resonators 140 is shown in FIG. 2A and a top view of the acoustic resonators in FIG. 2A is shown in FIG. 2B. The acoustic resonators 140 include a plurality of quarter-wavelength tubes 141 (also referred to herein as "quarter-wavelength tube 141" or "quarter-wavelength tubes 141") with a first end 141*a* and a second end 141*b*. The first end 141*a* is open, i.e., in fluid communication with the opening 110 and/or the duct 120, and the second end 141*b* is closed or sealed. Also, each of the quarter-wavelength tubes 141 have a width 'W', and height 'H' and a length 'L' identified or shown as L1, L2, L3, . . . L15 in FIG. 2B.

The acoustic resonators 140 can include subsets of quarter-wavelength tubes 141 and subsets of the quarter-wavelength tubes 141 can extend in a generally normal direction for at least one planar side of the opening 110 and/or the duct 120. For example, the acoustic resonators 140 shown in FIGS. 2A-2B include a first subset of quarter-wavelength tubes 142, a second subset of quarter-wavelength tubes 144, a third subset of quarter-wavelength tubes 146, and a fourth subset of quarter-wavelength tubes 148. In some variations all of the quarter-wavelength tubes 141 within a subset of acoustic resonators have a different length L as illustrated by the lengths L of the quarter-wavelength tubes 141 in the first subset of quarter-wavelength tubes 142, the second subset of quarter-wavelength tubes 144, the third subset of quarter-wavelength tubes 146, and the fourth subset of quarter-wavelength tubes 148. And as noted above, the length L of a given quarter-wavelength tube 141 can be defined by the expression f=c/4L such that each of the quarter-wavelength tubes 141 has a desired resonance such that the acoustic resonators 140 absorb a band of frequencies and reemit the frequencies with the opposite phase such that the reemitted frequencies interfere with the incoming sound waves via attenuation.

Still referring to FIG. 2B, in some variations the first subset of quarter-wavelength tubes 142 extend from a first planar side 112 of the opening 110 and/or the duct 120, the second subset of quarter-wavelength tubes 144 extend from a second planar side 114 of the opening 110 and/or the duct 120, the third subset of quarter-wavelength tubes 146 extend from a third planar side 116 of the opening 110 and/or the duct 120, and the fourth subset of quarter-wavelength tubes 148 extend from a fourth planar side 118 of the opening 110 and/or duct 120. It should be understood that in some variations the sound absorbing device 10 does not include one, two, or three of the first subset of quarter-wavelength tubes 142, the second subset of quarter-wavelength tubes 144, the third subset of quarter-wavelength tubes 146, and the fourth subset of quarter-wavelength tubes 148. Accordingly, in at least one variation the quarter-wavelength tubes 141 extend from all of the planar sides of the opening 110 and/or the duct 120, while in other variations, the quarter-wavelength tubes 141 do not extend from all of the planar sides of the opening 110 and/or the duct 120.

In some variations, the acoustic resonators 140 have or exhibit symmetry about a geometric plane. For example, and as illustrated in FIG. 2B, the opening 110 and/or the duct 120 has a rectangular cuboid shape with the first planar side 112 parallel to the second planar side 114 and the third planar side 116 parallel with the fourth planar side 118. And in such variations, the first subset of quarter-wavelength tubes 142 and the second subset of quarter-wavelength tubes 144 exhibit mirror symmetry about a plane P1 and the third subset of quarter-wavelength tubes 146 and the fourth subset of quarter-wavelength tubes 148 exhibit mirror symmetry relative about a plane P2. Accordingly, in some variations the second subset of quarter-wavelength tubes 144 has mirror symmetry with the first subset of quarter-wavelength tubes 142 and/or the fourth subset of quarter-wavelength tubes 148 has mirror symmetry with the third subset of quarter-wavelength tubes 146.

Figure 3:
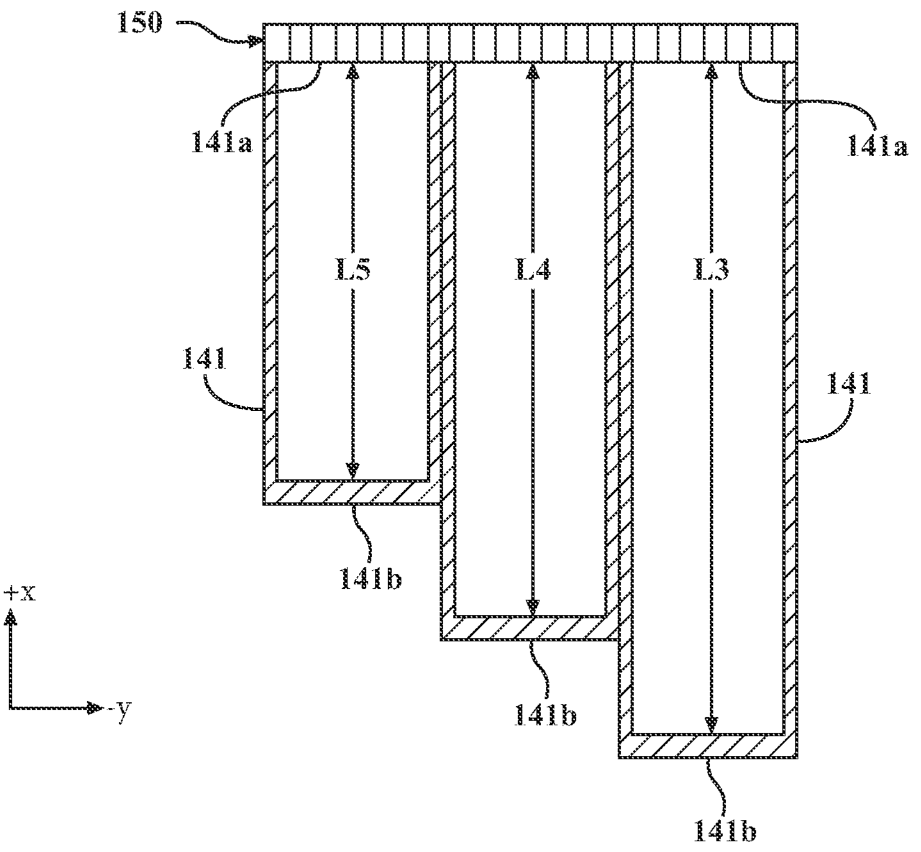
FIG. 3 is a top cross sectional view of a plurality of acoustic resonators with at least one fabric layer according to the teachings of the present disclosure.

Referring to FIG. 3, in some variations one or more of the quarter-wavelength tubes 141 have at least one fabric layer 150 covering the first end 141*a* as disclosed in U.S. patent application Ser. No. 17/851,422 filed on Jun. 28, 2022, which is incorporated herein in its entirety by reference. The at least one fabric layer 150 has a predefined thickness, average pore size, and porosity and can be made or formed from any type of fabric suitable for use to enhance acoustic loss. Non-limiting examples of fabric include silk, wool, linen cotton, rayon, nylon, polyesters, and combinations thereof, including woven fabrics such as plain weave fabric, twill weave fabric, and satin weave fabric. It should be understood that fabric generally absorbs acoustic waves by converting acoustic energy of acoustic waves into heat.

Figure 4:
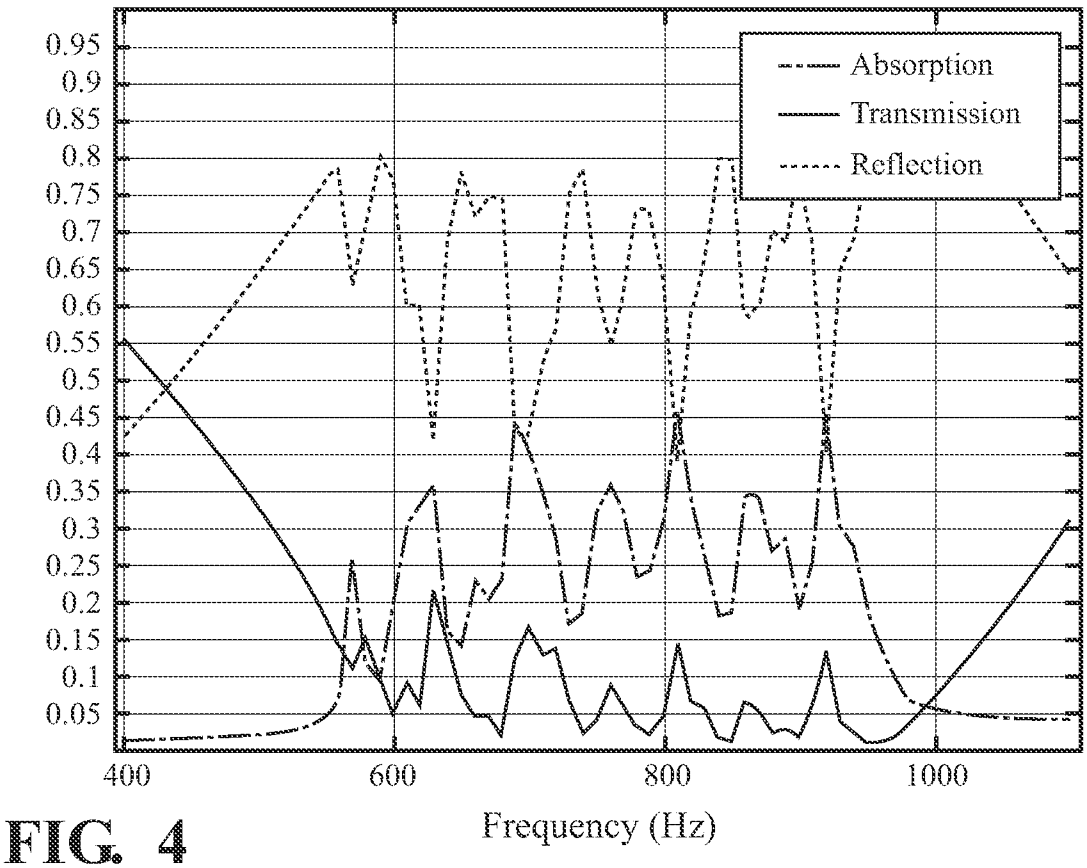
FIG. 4 is a plot of Absorption, Transmission, and Reflection versus Frequency for one example of a sound absorbing device according to the teachings of the present disclosure.

Referring to FIG. 4, a plot of calculated absorption, transmission, and reflection of acoustic waves having a range of frequencies and propagating within the duct 120 in the +z direction (FIG. 1A) is shown. The calculated absorption, transmission, and reflection shown in FIG. 3 assumed the opening 110 had a length (x direction) equal to 100 millimeters (mm) and a width (y direction) equal to 50 mm. Also, the width W (FIG. 2A) of each of the quarter-wavelength tubes 141 was equal to 9 mm, the height H of each of the quarter-wavelength tubes 141 was equal to 30 mm, and the lengths L of each of the quarter-wavelength tubes 141 were: L1=131.9 mm, L2=116.5 mm, L3=120.3 mm, L4=102.3 mm, L5=89.7 mm, L6=128.0 mm, L7=112.8 mm, L8=105.7 mm, L9=99.0 mm, L10=86.8 mm, L11=124.1 mm, L12=92.7 mm, L13=109.2 mm, L14=95.8 mm, and L15=84.0 mm. And as shown in FIG. 3, transmission of the acoustic waves with frequencies between 600 Hz and 1000 Hz was suppressed to less than about 20%. Accordingly, the sound absorbing device 10 provides broadband suppression of acoustic waves propagating through the duct 120 and the opening 110.

Figure 5:
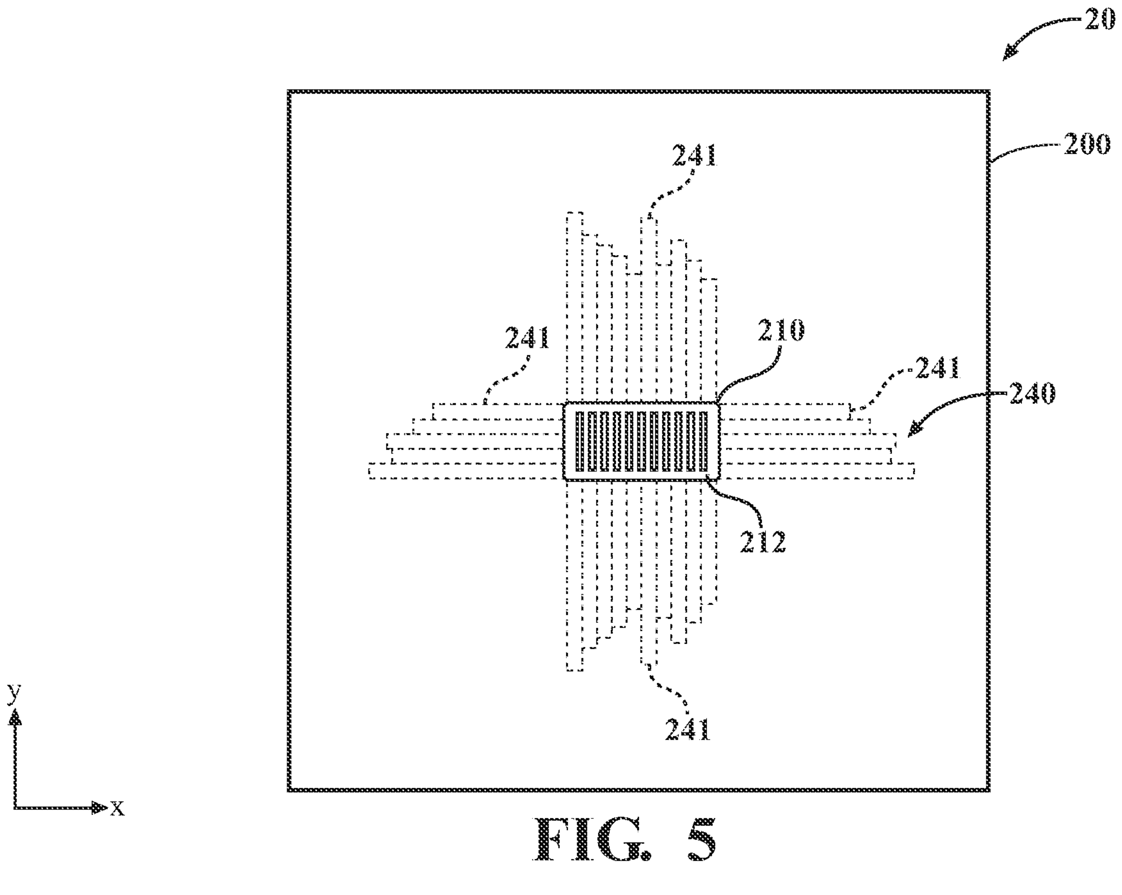
FIG. 5 is top view of another a sound absorbing device according to the teachings of the present disclosure.

Referring now to FIG. 5, another sound absorbing device 20 according to the teachings of the present disclosure is shown. The sound absorbing device includes a panel 200 with a grill 212 covering an opening 210. The sound absorbing device 20 includes a duct (not shown) in fluid communication with the opening 210 and a plurality of resonators 240 in fluid communication with the opening 210 and/or the duct. And similar to the plurality of acoustic resonators 140 discussed above, the plurality of resonators 240 include individual quarter-wavelength tubes 241 that have a width, a height, and a length such that broadband suppression of acoustic waves is provided. Non-limiting examples of the panel 200 include a land vehicle panel with an air duct, a house panel with an air duct, a water vehicle panel with an air duct, an aerospace vehicle with an air duct, among others.

It should be understood from the teachings of the present disclosure that sound absorbing devices that include one or more acoustic resonators decorated with fabric are provided. The fabric can be at least one fabric layer that absorbs acoustic frequencies generally not absorbed by the one or acoustic resonators without the at least one fabric layer. That is, average pore size, the range of pore sizes, the distance and volume of gas between at least two fabric layers, and/or the elasticity and/or vibration properties of a fabric layer are adjustable such that an increased range of acoustic frequencies that are absorbed by the sound absorbing device is provided.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be conducted in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A sound absorbing device comprising:

a panel with a first surface, a second surface, and an opening extending through the first surface and the second surface;

an air duct comprising a polyhedron shaped duct with planar sides extending from the panel and in fluid communication with the opening, the air duct comprising a panel end in contact with the second surface of the panel and complimentary in shape and size with the opening such that gas flows through the duct towards and through the opening; and a plurality of straight quarter-wavelength tubes arranged around and extending from each planar side of the air duct and in fluid communication with the air duct and embedded within the panel between the first surface and the second surface, the plurality of straight quarter-wavelength tubes extending entirely along and parallel to a single plane that is perpendicular to a length direction of the duct.

2. The sound absorbing device according to claim 1, wherein the plurality of straight quarter-wavelength tubes are completely embedded within the panel.

3. The sound absorbing device according to claim 1, wherein the duct has a rectangular cuboid shape with four planar sides.

4. The sound absorbing device according to claim 3, wherein the plurality of straight quarter-wavelength tubes comprises a first subset of straight quarter-wavelength tubes extending in a direction generally normal to a first planar side of the duct and a second subset of straight quarter-wavelength tubes extending in a direction generally normal to a second planar side of the duct, and each of the first subset of straight quarter-wavelength tubes have a different length and each of the second subset of straight quarter-wavelength tubes have a different length.

5. The sound absorbing device according to claim 4, wherein the second subset of straight quarter-wavelength tubes has mirror symmetry with the first subset of straight quarter-wavelength tubes.

6. The sound absorbing device according to claim 5, wherein the plurality of straight quarter-wavelength tubes comprises a third subset of straight quarter-wavelength tubes extending in a direction generally normal to a third planar side of the duct and a fourth subset of straight quarter-wavelength tubes extending in a direction generally normal to a fourth planar side of the duct, and each of the third subset of straight quarter-wavelength tubes have a different length and each of the fourth subset of straight quarter-wavelength tubes have a different length.

7. The sound absorbing device according to claim 6, wherein the fourth subset of quarter-wavelength tubes has mirror symmetry with the third subset of quarter-wavelength tubes.

8. A sound absorbing device comprising:

a panel with a first surface, a second surface, and an opening extending through the first surface and the second surface;

a duct comprising a polyhedron shaped duct with planar sides with planar sides extending from the panel, the duct complimentary in shape, centered on, and being in fluid communication with the opening such that gas flows through the duct towards and through the opening; and a plurality of straight quarter-wavelength tubes arranged around and extending from each planar side of the duct and in fluid communication with the duct and embedded within the panel between the first surface and the second surface, the plurality of straight quarter-wavelength tubes extending entirely and parallel to along a single plane between the first surface and the second surface that is perpendicular to a length direction of the duct.

9. The sound absorbing device according to claim 8, wherein the duct has a rectangular cuboid shape with four planar sides, and the plurality of quarter-wavelength tubes comprises a first subset of straight quarter-wavelength tubes extending in a direction generally normal to a first planar side of the duct and a second subset of straight quarter-wavelength tubes extending in a direction generally normal to a second planar side of the duct.

10. The sound absorbing device according to claim 9, wherein the plurality of quarter-wavelength tubes further comprises a third subset of straight quarter-wavelength tubes extending in a direction generally normal to a third planar side of the duct and a fourth subset of straight quarter-wavelength tubes extending in a direction generally normal to a fourth planar side of the duct.

11. A sound absorbing device comprising:

a panel with a first surface, a second surface, and an opening extending through the first surface and the second surface;

a duct having a rectangular cuboid shape and extending from the panel, the duct complimentary in shape, centered on, and being in fluid communication with the opening such that gas flows through the duct towards and through the opening; and a plurality of straight quarter-wavelength tubes arranged around and extending from each planar side of the duct and in fluid communication with the duct and embedded within the panel between the first surface and the second surface, the plurality of straight quarter-wavelength tubes extending entirely along and parallel to a single plane that is perpendicular to a length direction of the duct, wherein the plurality of straight quarter-wavelength tubes comprises a first subset of straight quarter-wavelength tubes extending in a direction generally normal to a first planar side of the duct, a second subset of straight quarter-wavelength tubes extending in a direction generally normal to a second planar side of the duct, a third subset of straight quarter-wavelength tubes extending in a direction generally normal to a third planar side of the duct, and a fourth subset of straight quarter-wavelength tubes extending in a direction generally normal to a fourth planar side of the duct.

12. The sound absorbing device according to claim 11, wherein the second subset of straight quarter-wavelength tubes has mirror symmetry with the first subset of straight quarter-wavelength tubes and the fourth subset of straight quarter-wavelength tubes has mirror symmetry with the third subset of straight quarter-wavelength tubes.

* * * * *